US011959679B2

(12) United States Patent
Mullin et al.

(10) Patent No.: US 11,959,679 B2
(45) Date of Patent: Apr. 16, 2024

(54) DRIVE CIRCUIT FOR A VARIABLE SPEED FAN MOTOR

(71) Applicant: REGAL BELOIT AMERICA, INC., Beloit, WI (US)

(72) Inventors: Paul S. Mullin, Yellow Springs, OH (US); Daniel E. Thompson, Troy, OH (US); Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 713 days.

(21) Appl. No.: 17/069,072

(22) Filed: Oct. 13, 2020

(65) Prior Publication Data

US 2021/0025631 A1    Jan. 28, 2021

Related U.S. Application Data

(63) Continuation-in-part of application No. 16/262,367, filed on Jan. 30, 2019, now Pat. No. 10,801,766.

(51) Int. Cl.
| | |
|---|---|
| *F25B 49/02* | (2006.01) |
| *F04D 27/00* | (2006.01) |
| *F25B 31/02* | (2006.01) |
| *H02P 27/06* | (2006.01) |

(52) U.S. Cl.
CPC .......... *F25B 49/022* (2013.01); *F04D 27/004* (2013.01); *F25B 31/02* (2013.01); *H02P 27/06* (2013.01); *F25B 2600/111* (2013.01); *F25B 2600/112* (2013.01); *F25B 2700/151* (2013.01)

(58) Field of Classification Search
CPC .................... F25B 49/022; F25B 31/02; F25B 2600/111–112; F25B 2700/151; F04D 27/004; H02P 27/06
USPC ........................................................ 700/275
See application file for complete search history.

(56) References Cited

U.S. PATENT DOCUMENTS

| | | | |
|---|---|---|---|
| 4,476,424 A | 10/1984 | Kalman | |
| 4,856,286 A | 8/1989 | Sulfstede et al. | |
| 5,144,812 A | 9/1992 | Mills, Jr. et al. | |
| 5,492,273 A * | 2/1996 | Shah | F24F 11/88 236/11 |
| 5,568,732 A | 10/1996 | Isshiki et al. | |

(Continued)

FOREIGN PATENT DOCUMENTS

GB            2059644 A       4/1981

*Primary Examiner* — Md Azad
(74) *Attorney, Agent, or Firm* — Armstrong Teasdale LLP

(57) ABSTRACT

A fan drive circuit for a variable speed fan motor in a cooling system, includes an inverter configured to supply a current signal to stator windings of the variable speed fan motor, a frequency detection circuit coupled to an output stage of an inverter of a compressor motor of the cooling system and configured to detect a first frequency of a compressor current signal at the output stage of a variable speed compressor drive circuit and generate a frequency signal, and a digital signal processor (DSP) coupled to the inverter and the frequency detection circuit. The DSP is configured to receive the frequency signal corresponding to the first frequency from the frequency detection circuit, select a second frequency corresponding to the first frequency at which to operate the variable speed fan motor, and transmit control signals to the inverter to supply current to the stator windings at the second frequency.

20 Claims, 9 Drawing Sheets

(56) References Cited

U.S. PATENT DOCUMENTS

| | | | |
|---|---|---|---|
| 5,592,058 A * | 1/1997 | Archer | F24F 11/41 |
| | | | 318/400.11 |
| 6,175,210 B1 | 1/2001 | Schwartz et al. | |
| 6,323,625 B1 * | 11/2001 | Bhargava | F02C 7/268 |
| | | | 322/32 |
| 7,836,713 B2 | 11/2010 | Lifson et al. | |
| 8,015,834 B2 | 9/2011 | Kotani et al. | |
| 9,513,043 B2 | 12/2016 | Keres et al. | |
| 9,800,188 B2 | 10/2017 | Chretien et al. | |
| 10,190,591 B2 | 1/2019 | Havard, Jr. | |
| 10,462,942 B2 | 10/2019 | Borisov et al. | |
| 2001/0045101 A1 | 11/2001 | Graham et al. | |
| 2003/0043606 A1 | 3/2003 | Lipo et al. | |
| 2005/0188708 A1 | 9/2005 | Wills et al. | |
| 2008/0276637 A1 | 11/2008 | Lifson et al. | |
| 2009/0007577 A1 * | 1/2009 | Kotani | F25B 49/02 |
| | | | 62/177 |
| 2009/0097988 A1 | 4/2009 | Shizuo et al. | |
| 2009/0255278 A1 | 10/2009 | Taras et al. | |
| 2011/0030398 A1 | 2/2011 | Marcinkiewicz et al. | |
| 2015/0042248 A1 | 2/2015 | Nikolov et al. | |
| 2015/0322616 A1 | 11/2015 | Dal Ben et al. | |
| 2017/0077859 A1 | 3/2017 | Chretien et al. | |
| 2017/0167744 A1 * | 6/2017 | Arensmeier | F24F 11/30 |
| 2017/0302200 A1 | 10/2017 | Marcinkiewicz | |
| 2021/0099109 A1 * | 4/2021 | Milivojevic | H02P 1/426 |
| 2022/0320997 A1 * | 10/2022 | Marcinkiewicz | H02P 5/74 |

\* cited by examiner

DRIVE CIRCUIT FOR A VARIABLE SPEED FAN MOTOR

CROSS-REFERENCE TO RELATED APPLICATIONS

The present application claims the benefit of and priority to U.S. patent application Ser. No. 16/262,367, filed Jan. 30, 2019, and entitled "DRIVE CIRCUIT FOR A VARIABLE SPEED FAN MOTOR", the disclosure of which is hereby incorporated by reference in its entirety.

BACKGROUND

The field of the disclosure relates generally to electric motors and cooling systems, and, more particularly, to a drive circuit for a variable speed fan motor.

Cooling systems generally include a compressor, a condenser fan, and an evaporator fan, each powered by one or more electric motors. Greater energy efficiency can be achieved when the compressor uses a variable speed motor. Generally, fan motors used in cooling systems lack hardware and software for operating at a variable speed, and adding such hardware or software to a cooling system to facilitate variable speed operation may significantly increase the cost of the cooling system. It is desirable for cooling systems to have variable speed fan motors without the need for additional hardware or software, and without significant cost.

BRIEF DESCRIPTION

In one aspect, a fan drive circuit for a variable speed fan motor in a cooling system includes an inverter configured to supply a current signal to stator windings of the variable speed fan motor. The fan drive circuit also includes a frequency detection circuit coupled to an output stage of an inverter of a compressor motor of the cooling system and configured to detect a first frequency of a compressor current signal at the output stage of a variable speed compressor drive circuit and generate a frequency signal. The fan drive circuit also includes a digital signal processor (DSP) coupled to the inverter and the frequency detection circuit. The DSP is configured to receive the frequency signal corresponding to the first frequency from the frequency detection circuit. The DSP is further configured to select a second frequency corresponding to the first frequency at which to operate the variable speed fan motor. The DSP is further configured to transmit control signals to the inverter to supply current to the stator windings at the second frequency.

In another aspect, a method of operating a variable speed fan motor includes detecting, by a variable speed fan drive circuit, a first frequency of a compressor current signal at an output stage of an inverter supplying stator windings of a variable speed compressor motor. The method also includes selecting, by the variable speed fan drive circuit, a second frequency corresponding to the first frequency, at which to operate the variable speed fan motor. The method also includes supplying, by the variable speed fan drive circuit, a fan current signal to stator windings of the variable speed fan motor, the fan current signal having the second frequency.

In yet another aspect, a cooling system includes a variable speed compressor motor having compressor stator windings. The cooling system also includes a variable speed compressor drive circuit coupled to the variable speed compressor motor and configured to supply a first current signal having a first frequency to the compressor stator windings. The cooling system also includes a variable speed fan motor having fan stator windings, and a variable speed fan drive circuit coupled to the variable speed fan motor. The variable speed fan drive circuit includes an inverter configured to supply a second current signal to fan stator windings. The variable speed fan drive circuit also includes a frequency detection circuit coupled to the variable speed compressor drive circuit and configured to detect the first frequency of the first current signal. The variable speed fan drive also includes a digital signal processor (DSP) coupled to the inverter and the frequency detection circuit. The DSP is configured to receive a frequency signal corresponding to the first frequency from the frequency detection circuit. The DSP is further configured to select a second frequency corresponding to the first frequency at which to operate the variable speed fan motor. The DSP is further configured to transmit control signals to the inverter to control the inverter to supply current to the fan stator windings at the second frequency.

In yet another aspect, a fan drive circuit for a variable speed fan motor in a cooling system is provided. The fan drive circuit includes a fan inverter configured to supply a current signal to stator windings of the variable speed fan motor. The fan drive circuit further includes a sensor coupled to a power input stage of a compressor motor and configured to generate a sensor signal, wherein the sensor signal represents an amplitude of one of a current or a power at the power input stage. The fan drive circuit further includes a digital signal processor (DSP) coupled to the fan inverter and the sensor. The DSP is configured to receive the sensor signal corresponding to the amplitude from the sensor, select a frequency corresponding to the amplitude at which to operate the variable speed fan motor, and transmit control signals to the fan inverter to supply current to the stator windings at the selected frequency.

In yet another aspect, a method of operating a variable speed fan motor is provided. The method includes detecting, by a variable speed fan drive circuit, an amplitude of one of a current or a power of a line input signal at a power input stage of an compressor motor. The method further includes selecting, by the variable speed fan drive circuit, a frequency corresponding to the amplitude, at which to operate the variable speed fan motor. The method further includes supplying, by the variable speed fan drive circuit, a fan current signal to stator windings of the variable speed fan motor, the fan current signal having the selected frequency.

In yet another aspect, a cooling system is provided. The cooling system includes a compressor motor, a variable speed fan motor including fan stator windings, and a variable speed fan drive circuit coupled to the variable speed fan motor. The variable speed fan drive circuit includes a fan inverter configured to supply a current signal to the fan stator windings. The variable speed fan drive circuit further includes a sensor coupled to a power input stage of the compressor motor and configured to detect an amplitude of one of a current or a power at the power input stage. The variable speed fan drive circuit further includes a digital signal processor (DSP) coupled to the fan inverter and the sensor. The DSP is configured to receive a sensor signal corresponding to the amplitude from the sensor, select a frequency corresponding to the amplitude or at which to operate the variable speed fan motor, and transmit control signals to the fan inverter to control the fan inverter to supply current to the fan stator windings at the selected frequency.

DETAILED DESCRIPTION

The embodiments described herein provide a variable speed fan motor for use in a cooling system, such as, for example, a commercial refrigerator. The embodiments described herein enable the operation of fan motors at variable speeds in coordination with a compressor motor. More specifically, the fan motors described herein are configured to detect a frequency of a current signal (or voltage signal) supplied to stator windings of the compressor motor and determine a frequency at which to supply current (or voltage) to stator windings of the fan motor based on the detected frequency of the compressor current signal. Accordingly, the fan motor is controlled by the compressor current signal supplied to the stator windings of the compressor. Thus, the fan motor operates at a variable speed and coordinates that variable speed with the compressor motor without the need for additional hardware or software. For example, during periods of lower cooling demand, where the compressor motor operates at a reduced speed, the speed of the fan motor is reduced in coordination with the speed of the compressor motor.

Further, the embodiments described herein enable the operation of fan motor at variables speeds in implementations wherein the compressor is fixed speed. More specifically, in such embodiments, the fan motors are configured to detect an amplitude of a current signal or power signal at a line power input of the compressor. Accordingly, the fan speed is controlled according to the detected amplitude, which corresponds to a power or current draw of the compressor, and accordingly, is proportional to a cooling load of the cooling system.

Figure 1:
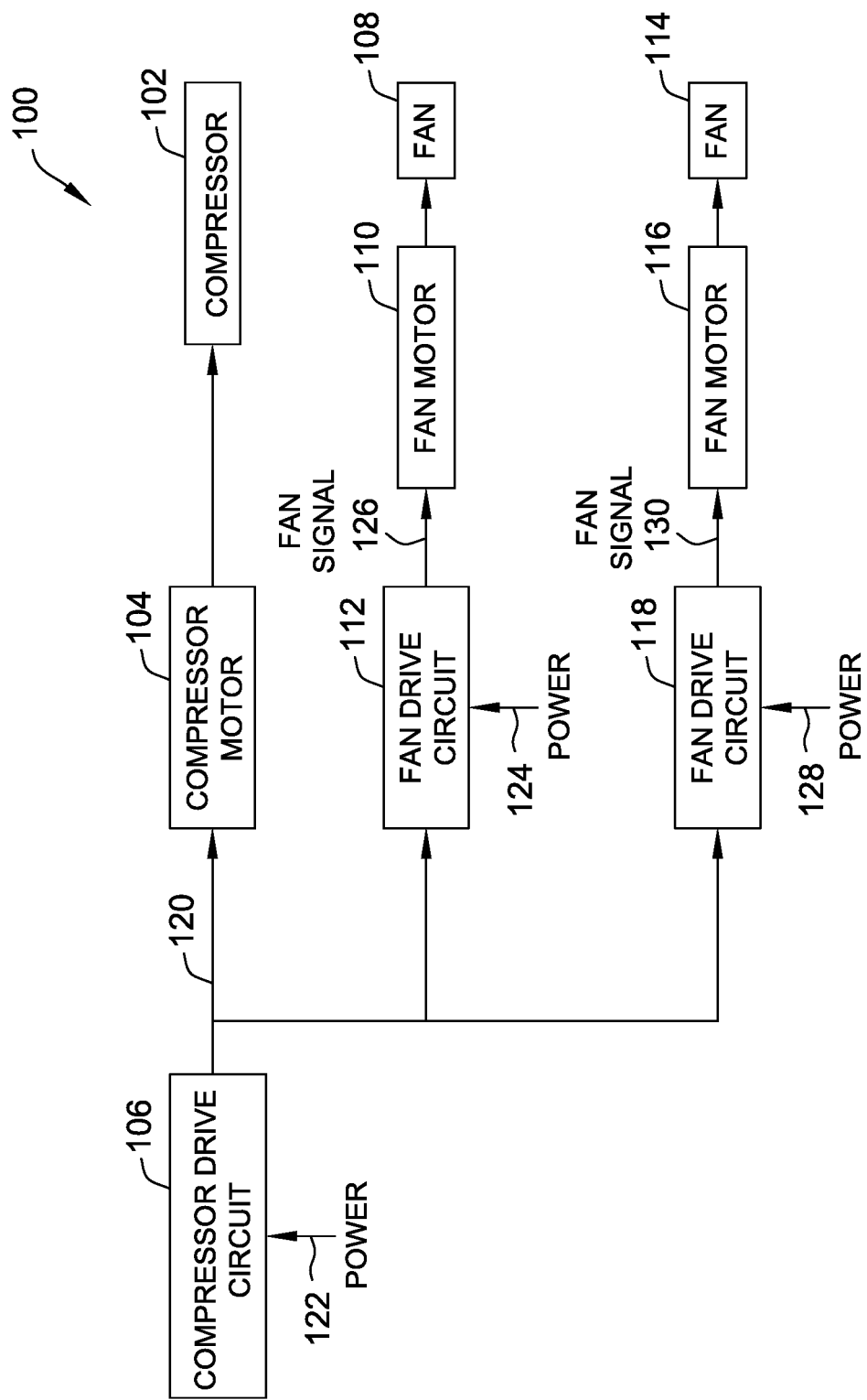
FIG. 1 is a block diagram of an exemplary cooling system.

FIG. 1 is a block diagram of an exemplary cooling system 100. Cooling system 100 includes a compressor 102, a compressor motor 104, a compressor drive circuit 106, a condenser fan 108, a condenser fan motor 110, a condenser fan drive circuit 112, an evaporator fan 114, an evaporator fan motor 116, and an evaporator fan drive circuit 118.

Compressor motor 104 operates compressor 102 of cooling system 100. Compressor 102 uses mechanical (i.e., rotational) energy from compressor motor 104 to compress a refrigerant to a higher pressure. The rate at which cooling system 100 can exchange heat depends on the speed at which compressor motor 104 operates compressor 102. Compressor motor 104 includes a rotor and a stator (not shown). Compressor motor 104 may, for example, be an induction motor that can be driven by an alternating current (AC) signal. Alternatively, compressor motor 104 may be an electrically commutated motor, for example.

Compressor drive circuit 106 converts a line input signal 122 to compressor current signal 120 to energize the stator windings (not shown) of compressor motor (104). Line input signal 122 may be, for example, AC line power. In certain embodiments, line input signal 122 is an AC signal having a frequency of, for example, 50 Hertz or 60 Hertz. Compressor drive circuit 106 may be coupled to and receive line input signal 122 signal from a power line. Compressor drive circuit 106 generates compressor current signal 120 such that the frequency of compressor current signal 120 may vary according to the cooling load, resulting in variation of the speed of compressor motor 104. Compressor drive circuit 106 selects the frequency of compressor current signal 120, and therefore the speed, based on a cooling mode of operation or cooling load. For example, compressor drive circuit 106 operates compressor motor 104 at different speeds corresponding to different modes of operation, such as low, medium, or high. Thus, the speed of compressor 102 can be adjusted to more optimally meet the demands of cooling system 100 at a given moment in time, allowing cooling system 100 to operate with greater energy efficiency. In some embodiments, compressor drive circuit 106 is capable of supplying compressor current signal 120 to the stator windings of compressor motor 104, in a first mode, directly from line input signal 122 at the frequency of line input signal 122, and in a second mode, from an inverter of compressor drive circuit 106 (sometimes referred to herein as a "compressor inverter") at a variable frequency.

Condenser fan motor 110 operates, or turns, condenser fan 108 of cooling system 100. Condenser fan 108 moves air across condenser coils, enabling an exchange of heat between the coils and moving air. Each condenser fan motor 110 includes a rotor and a stator (not shown). In certain embodiments, cooling system 100 includes a plurality of condenser fans 108 and condenser fan motors 110.

In some embodiments, condenser fan motor 110 is an electronically commutated direct current motor (ECM), allowing for greater energy efficiency. In other embodiments, condenser fan motor 110 may be an induction motor, or any other type of motor suitable for operating condenser fan 108.

Condenser fan drive circuit 112 generates a condenser fan current signal 126 based on a detected frequency of compressor current signal 120. Condenser fan drive circuit 112 receives power from condenser power signal 124, which may be, for example, AC line power. Condenser fan current signal 126 may be any signal suitable for driving condenser fan motor 110. Condenser fan drive circuit 112 varies the frequency of condenser fan current signal 126 to control the speed of condenser fan motor 110. Condenser fan drive circuit 112 selects the frequency of condenser fan current signal 126 based at least in part on the frequency of compressor current signal 120, enabling the speed of condenser fan motor 110 to be varied in coordination with the speed of compressor motor 104. Thus, the speed of condenser fan 108 can be adjusted to more optimally match the demand of cooling system 100 at a given moment in time, enabling cooling system 100 to operate with greater energy efficiency. Further, the speed of condenser fan 108 is coordinated with the speed of compressor 102, allowing for a greater efficiency benefit.

Evaporator fan motor 116 operates, or turns, evaporator fan 114 of cooling system 100. Evaporator fan 114 moves air across evaporator coils, enabling an exchange of heat between the coils and moving air. Evaporator fan motor 116 includes a rotor and a stator (not shown). In certain embodiments, cooling system 100 includes a plurality of evaporator fans 114 and evaporator fan motors 116.

In some embodiments, evaporator fan motor 116 is an electronically commutated motor (ECM), allowing for greater energy efficiency. In other embodiments, Evaporator fan motor 116 may be an induction motor, or any other type of motor suitable for operating evaporator fan 114.

Evaporator fan drive circuit 118 generates an evaporator fan current signal 130 based on a detected frequency of compressor current signal 120. Evaporator fan drive circuit 118 receives power from evaporator power signal 128, which may be, for example, AC line power. Evaporator fan current signal 130 may be any signal suitable for driving evaporator fan motor 116. Evaporator fan drive circuit 118 varies the frequency of evaporator fan current signal 130 to control the speed of evaporator fan motor 116. Evaporator fan drive circuit 118 selects the frequency of evaporator fan current signal 130 based at least in part on the frequency of compressor current signal 120, enabling the speed of evaporator fan motor 116 to be varied in coordination with the speed of compressor motor 104. Thus, the speed of evaporator fan 114 can be adjusted to more optimally match the demand of cooling system 100 at a given moment in time, enabling cooling system 100 to operate with greater energy efficiency. Further, the speed of evaporator fan 114 is coordinated with the speed of compressor 102, allowing for a greater efficiency benefit.

Figure 2:
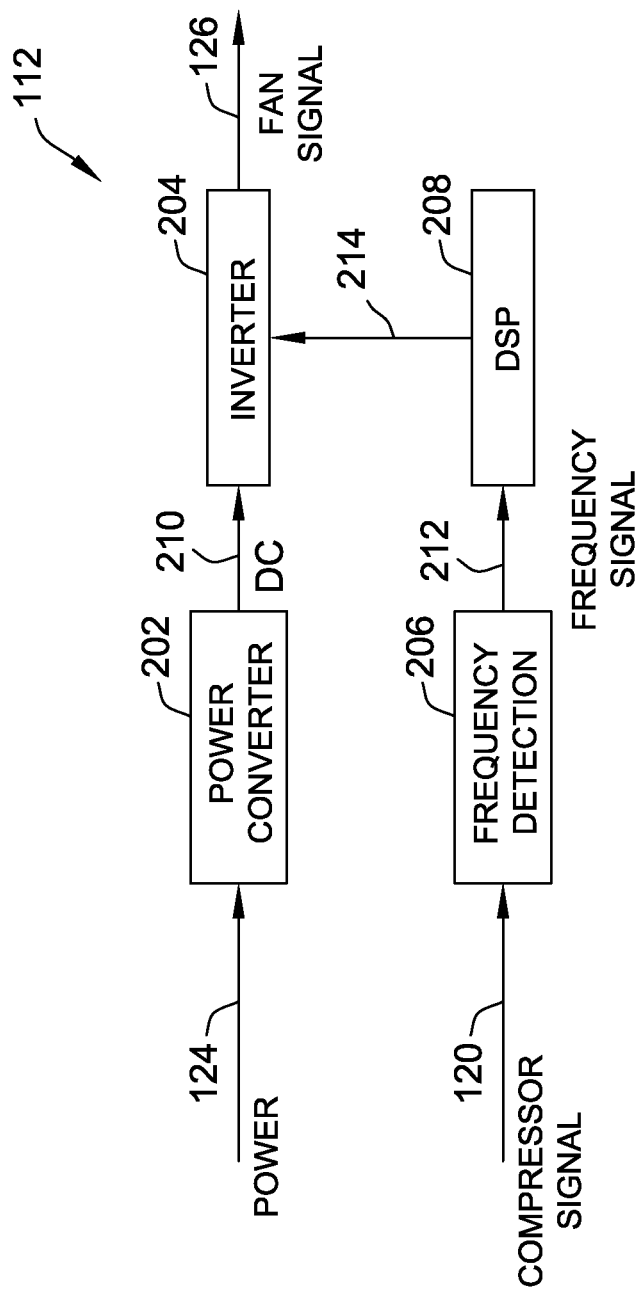
FIG. 2 is a block diagram of an exemplary condenser fan drive circuit for use in the cooling system shown in FIG. 1.

FIG. 2 is a block diagram of an exemplary condenser fan drive circuit 112. Condenser fan drive circuit 112 is used in cooling system 100 of FIG. 1 and is configured to operate condenser fan 108 (shown in FIG. 1). A similar evaporator fan drive circuit 118 is configured to operate evaporator fan 114 (shown in FIG. 1). Condenser fan drive circuit 112 includes a power converter 202, an inverter 204 (sometimes referred to herein as a "fan inverter"), a frequency detection circuit 206, and a digital signal processor (DSP) 208. In certain embodiments, DSP 208 may be a microcontroller, microcontroller, or other device suitable for controlling inverter 204.

Power converter 202 converts condenser power signal 124 to a direct current (DC) voltage 210. Condenser power signal 124 may be, for example, AC line power. Power converter 202 may include, for example, a rectifier, a filter, a lightning protection circuit, and the like.

Inverter 204 supplies stator windings of condenser fan motor 110 with condenser fan current signal 126. Inverter 204 may include, for example, a plurality of switches controlled by control signal 214. The switches of inverter can be open and closed selectively such that inverter 204 generates condenser fan current signal 126. In certain embodiments, for example, where condenser fan motor 110 is an ECM, condenser fan current signal 126 may be a variable frequency square wave signal. Control signal 214 controls the frequency of condenser fan current signal 126, and thus the speed of condenser fan motor 110.

Frequency detection circuit 206 receives compressor current signal 120 and detects the frequency of compressor current signal 120. Based on the frequency of compressor current signal 120, frequency detection circuit 206 transmits a frequency signal 212 to DSP 208, and DSP 208 interprets frequency signal 212 as the frequency of compressor current signal 120. For example, frequency signal 212 may include pulses at a frequency that correlates to the frequency of compressor current signal 120, enabling DSP 208 to analyze frequency signal 212 over time to calculate the corresponding frequency. In certain embodiments, frequency signal 212 may be either an analog or a digital signal. DSP 208 detects changes in the frequency signal over time to determine the frequency of compressor current signal 120. In embodiments where frequency signal 212 is an analog signal, DSP 208 may detect changes in, for example, the amplitude, frequency, or duty cycle of frequency signal 212. In embodiments where frequency signal 212 is a digital signal, DSP 208 may detect changes in discrete logic values of frequency signal 212.

DSP 208 controls the frequency at which inverter 204 operates condenser fan motor 110 by selecting the frequency and generating control signal 214 such that inverter 204 supplies condenser fan motor 110 with a condenser fan current signal 126 having the selected frequency. DSP 208 selects the frequency of condenser fan current signal 126 and generates control signal 214 by applying rules to the received frequency signal 212. Such rules may include, for example, a lookup table or software algorithms, for example, a polynomial function determined by regression analysis. DSP 208 interprets frequency signal 212 as the frequency of compressor current signal 120. Accordingly, DSP 208 selects the frequency of condenser fan current signal 126 based at least in part on the frequency of compressor voltage, enabling the speed of condenser fan motor 110 to be varied in coordination with the speed of compressor motor 104.

Figure 3:
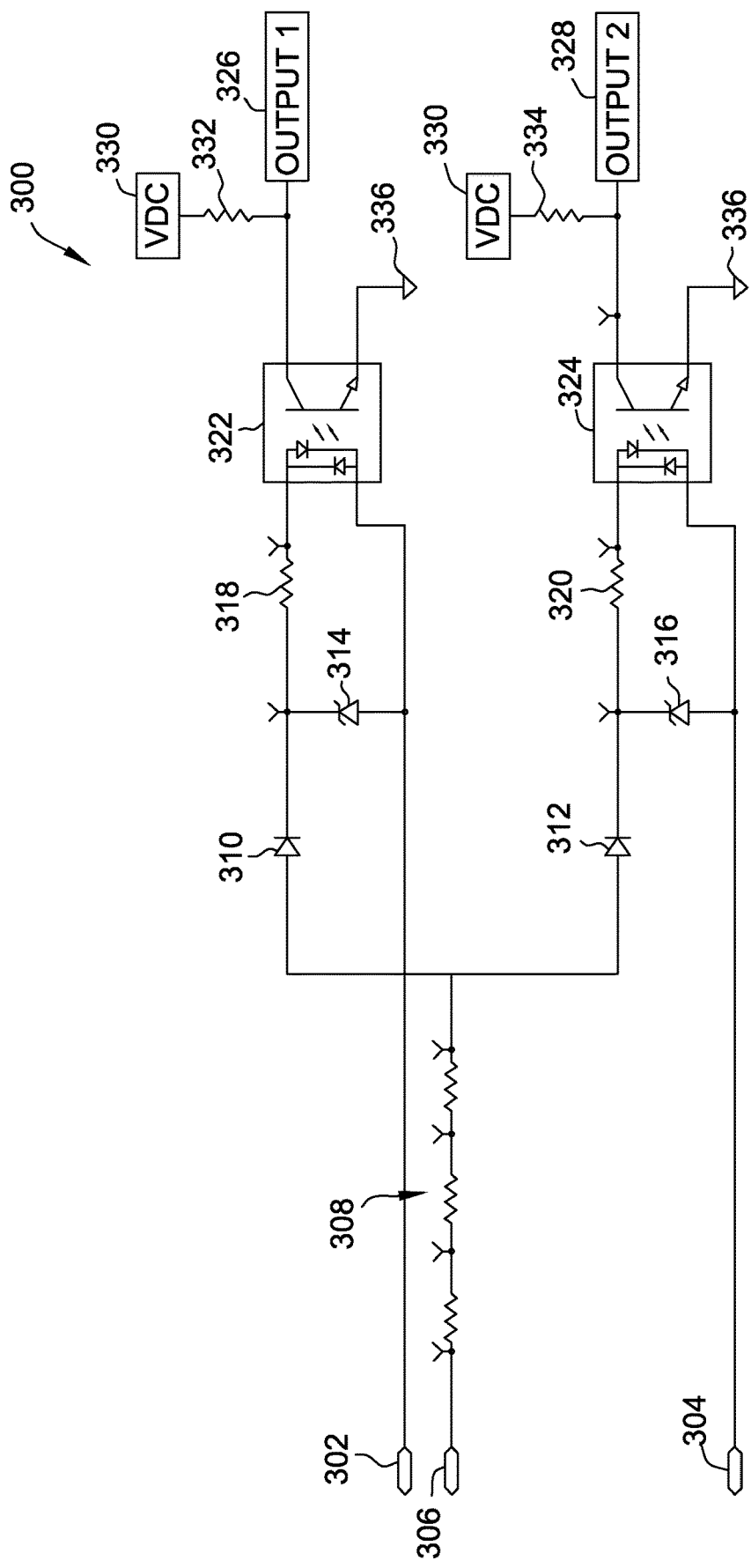
FIG. 3 is a schematic diagram of an exemplary frequency detection circuit that may be used in the condenser fan drive circuit shown in FIG. 2.

FIG. 3 is a schematic diagram of an exemplary frequency detection circuit 300 for use in condenser fan drive circuit 112 (shown in FIG. 1). Frequency detection circuit 300 includes a line connection 302, a neutral connection 304, and control input connection 306. Frequency detection circuit 300 further includes input resistance 308 coupled to control input connection 306. Control input connection 306 may be coupled to, for example, an output of compressor drive circuit 106 (shown in FIG. 1). Input resistance 308 controls the current at control input connection 306. Frequency detection circuit 300 further includes first diode 310, second diode 312, first Zener diode 314, a second Zener diode 316, a first resistor 318, a second resistor 320, a first opto-coupler 322, and a second opto-coupler 324. When current flows through first diode 310, first opto-coupler 322 is powered. When current flows through second diode 312, second opto-coupler 324 is powered. First Zener diode 314, second Zener diode 316, first resistor 318, second resistor 320 limit current through first opto-coupler 322 and second opto-coupler 324 in case of current spikes and surges.

Frequency detection circuit 300 further includes a first output connector 326 and a second output connector 328 that are connected to a unit receiving the output signal of frequency detection circuit 300, for example, DSP 208 shown in FIG. 2. Frequency detection circuit 300 further includes a DC high logic source 330, a first output resistor 332, a second output resistor 334 and a DC ground 336. When first opto-coupler 322 is activated, the DC signal at first output connector 326 is equal to that of DC ground 336. When second opto-coupler 324 is activated, the DC signal at second output connector 328 is equal to that of DC ground 336. When first opto-coupler 322 is not activated, the DC signal at first output connector 326 is equal to that of DC high logic source 330. When second opto-coupler 324 is not activated, the DC signal at second output connector 328 is equal to that of DC high logic source 330. A unit receiving the output signal of frequency detection circuit 300, for example, DSP 208, can interpret the DC signal at DC high logic source 330 and the DC signal at DC ground 336 as a first logic value and a second logic value.

First opto-coupler 322 and second opto-coupler 324 provide galvanic isolation between the input signal, such as compressor current signal 120, and the unit receiving the output of frequency detection circuit 300, such as DSP 208 shown in FIG. 2. First opto-coupler 322 and second opto-coupler 324 each include a pair of light emitting diodes (LEDs) with opposite polarities, such that a first LED will activate when the input signal is of a positive polarity and above a threshold magnitude, and a second LED will activate when the input signal is of a negative polarity and above a threshold magnitude. When an AC input signal is provided, the first LED activates on the positive cycle and the second LED activates on the negative cycle, and the output signal of first opto-coupler 322 and second opto-coupler 324 includes pulses corresponding to half cycles of the compressor current signal. A unit such as DSP 208 can thus interpret the output signal of frequency detection circuit over time to ascertain the frequency of the input signal.

Figure 4:
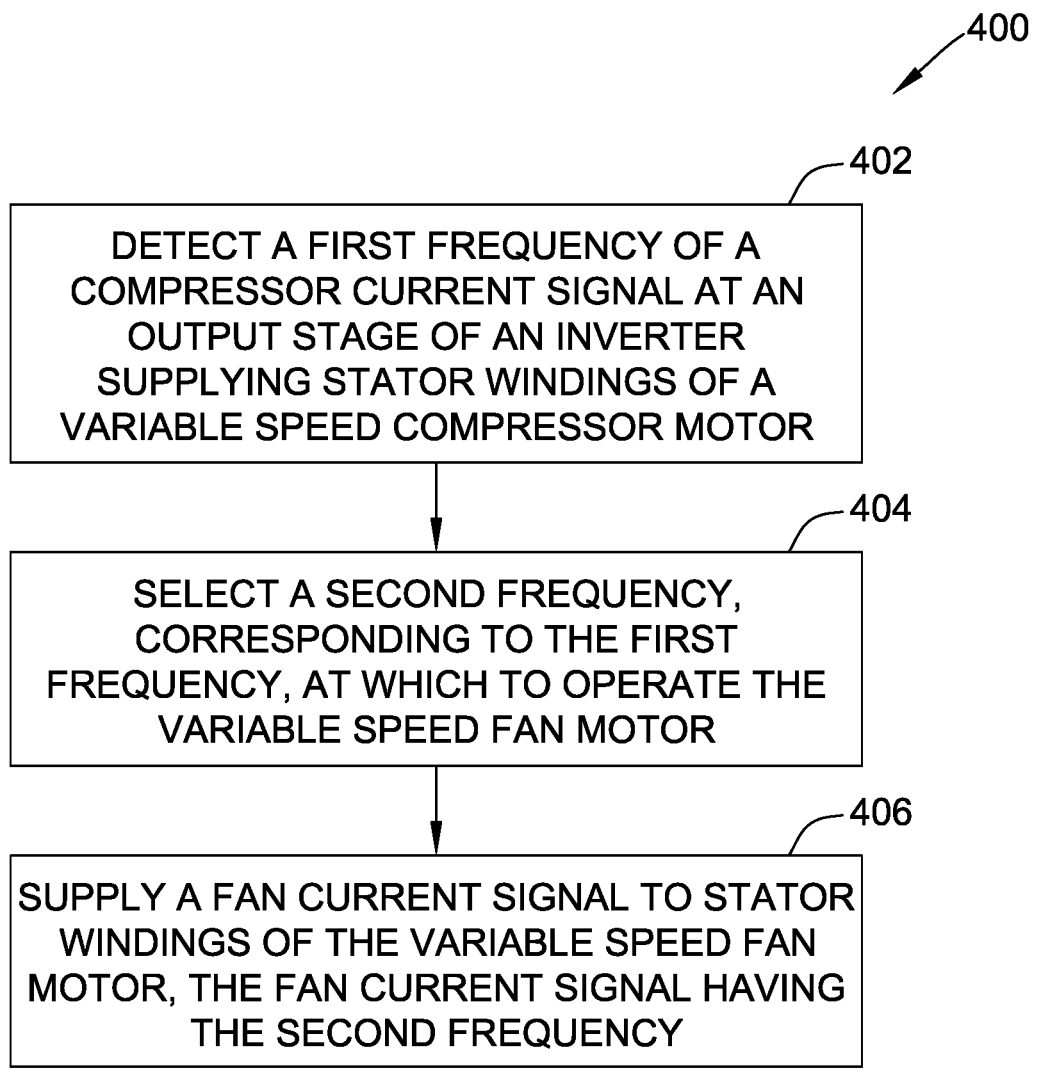
FIG. 4 is a flow chart of an exemplary method of operating a variable speed fan motor.

FIG. 4 is a flow chart of an exemplary method 400 of operating a variable speed fan motor such as condenser fan motor 110 shown in FIG. 1. Condenser fan drive circuit 112 detects 402 a first frequency of compressor current signal 120. For example, frequency detection circuit 206 of FIG. 2 may detect the frequency of compressor current signal 120, enabling DSP 208 to ascertain the frequency of compressor current signal 120. Condenser fan drive circuit 112 selects 404 a second frequency, corresponding to the first frequency, at which to operate condenser fan motor 110. For example, DSP 208 may use rules such as a lookup table or software algorithms, for example, a polynomial determined by regression analysis, to select a frequency at which to operate condenser fan motor 110, such that the speed of condenser fan 108 is coordinated with the speed of compressor 102. Condenser fan drive circuit 112 supplies 406 the stator windings of condenser fan motor 110 with a condenser fan current signal 126 having the second frequency. For example, DSP 208 generates and transmits control signal 214 to inverter 204 to control inverter 204 to supply stator windings of condenser fan motor 110 with a condenser fan current signal 126 having the second frequency, thereby coordinating the speed of condenser fan 108 with the speed of compressor 102 to achieve greater energy efficiency. Method 400 may be used in operating evaporator fan drive circuit 118 of FIG. 1 as well as condenser fan drive circuit 112.

Figure 5:
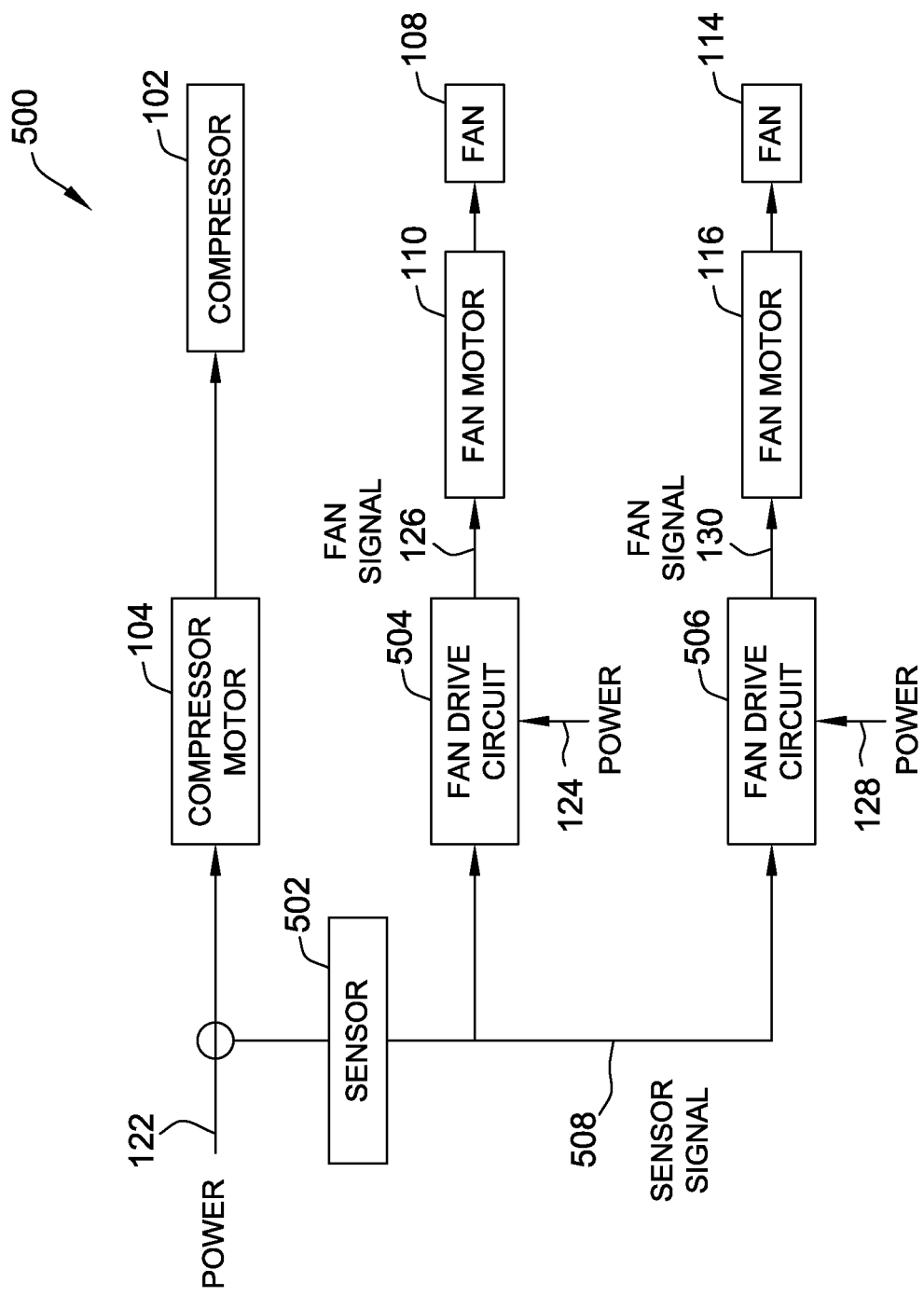
FIG. 5 is a block diagram of another exemplary cooling system.

FIG. 5 is a block diagram of an exemplary cooling system 500. Cooling system 100 includes compressor 102, compressor motor 104, a condenser fan 108, a condenser fan motor 110, an evaporator fan 114, and an evaporator fan motor 116, which each generally function as described with respect to FIG. 1. Cooling system 500 further includes a sensor 502, a condenser fan drive circuit 504, and an evaporator fan drive circuit 506.

As shown in FIG. 5, in some embodiments, compressor motor 104 receives a supply of current directly from line input signal 122. In such embodiments, compressor motor 104 may be, for example, a single-speed motor that is driven at the fixed frequency of the line input signal 122. In such a configuration, the power, and current, supplied by line input signal 122 automatically adjusts to the requirements of the cooling load. Accordingly, the power and current amplitude of line inputs signal 122 are indicative of the amount of work the compressor is providing.

Sensor 502 is configured to detect properties of line input signal 122 such as, for example, a current or power level. Based on the detected current or power, sensor 502 generates a sensor signal 508, which may be, for example, an analog or digital signal representing the detected current or power. In some embodiments, sensor 502 includes a current transformer or other device capable of generating an analog signal proportional to the detected line input signal without needing to be placed in contact with a conductor carrying line input signal 122. In certain embodiments, sensor 502 includes a voltage sensor and a current sensor that enable sensor 502 to determine the power of line input signal by multiplying the measured voltage and current. In some embodiments, sensor 502 includes an analog to digital converter configured to generate a digital logic signal corresponding to the measured current or power level.

Condenser fan drive circuit 504 and evaporator fan drive circuit 506 generally function as described with respect to condenser drive circuit 112 and evaporator drive circuit 118, respectively. Condenser fan drive circuit 504 and evaporator fan drive circuit 506 are coupled in communication with sensor 502, and are configured to control respective speeds of condenser fan motor 110 and evaporator fan motor 116 based on sensor signal 508. Thus, the speed of condenser fan 108 and evaporator fan 114 can be adjusted to more optimally match the demand of cooling system 500 at a given moment in time, enabling cooling system 500 to operate with greater energy efficiency.

Figure 6:
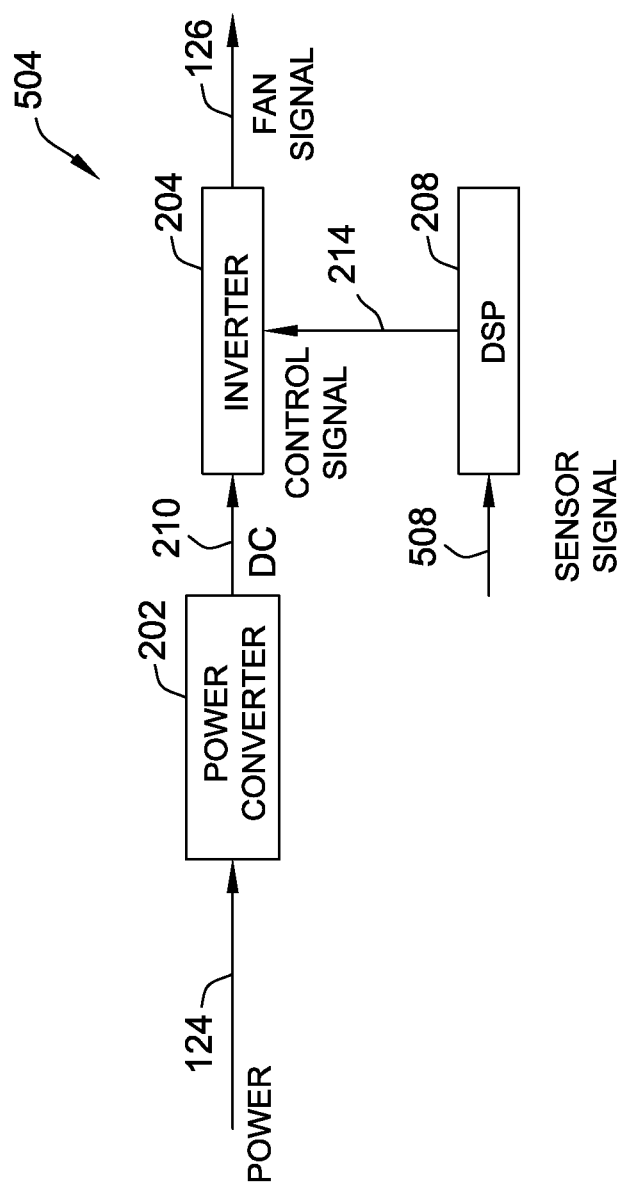
FIG. 6 is a block diagram of an exemplary condenser fan drive circuit for use in the cooling system shown in FIG. 5.

FIG. 6 is a block diagram of an exemplary condenser fan drive circuit 504 (shown in FIG. 5). Condenser fan drive circuit 504 includes power converter 202, inverter 204, and DSP 208, which generally function as described with respect to FIG. 2. DSP 208 is coupled to sensor circuit 502 and is configured to receive sensor signal 508.

DSP 208 is configured to determine, based on sensor signal 508, an amplitude of a power or current of line input signal 122. DSP 208 detects changes in sensor signal 508 over time to determine the amplitude of compressor current signal 120. In embodiments where sensor signal 508 is an analog signal, DSP 208 may detect changes in, for example, the amplitude, frequency, or duty cycle of sensor signal 508. In embodiments where sensor signal 508 is a digital signal, DSP 208 may detect changes in discrete logic values of sensor signal 508.

DSP 208 selects the frequency of condenser fan current signal 126 and generates control signal 214 by applying rules to the received sensor signal 508. Such rules may include, for example, a lookup table or software algorithms, for example, a polynomial function determined by regression analysis. DSP 208 interprets sensor signal 506 as the amplitude of, for example, the current or power level of line input signal 122. Accordingly, DSP 208 selects the frequency of condenser fan current signal 126 based at least in part on the amplitude of line input signal 122, enabling the speed of condenser fan motor 110 to be varied in coordination with the power or current demand, and accordingly the cooling demand, of compressor motor 104.

Figure 7:
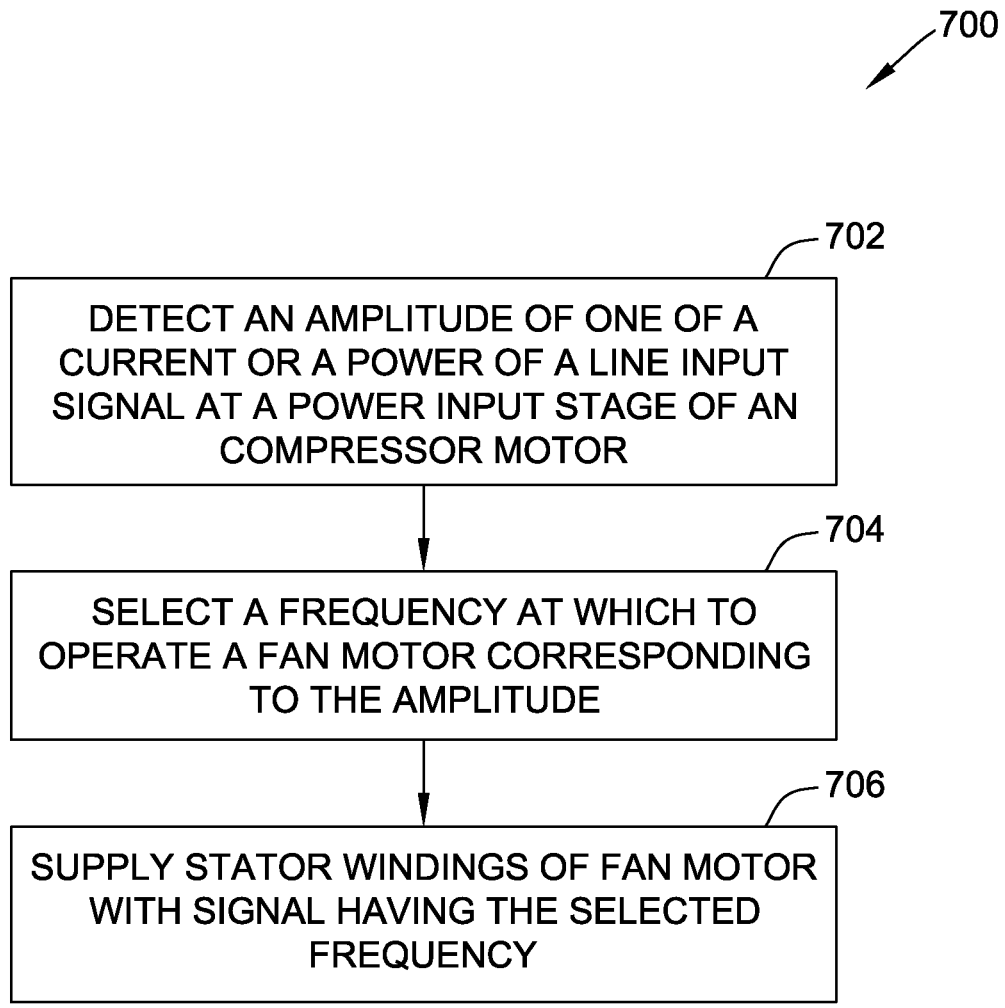
FIG. 7 is a flow chart a flow chart of another exemplary method of operating a variable speed fan motor.

FIG. 7 is a flow chart of an exemplary method 700 of operating a variable speed fan motor such as condenser fan motor 110 shown in FIG. 5. Condenser fan drive circuit 504 detects 702 an amplitude of one of a current or a power of line input signal 122 at a power input stage of compressor motor 104. For example, sensor 502 of FIG. 5 may detect the amplitude of line input signal 122, enabling DSP 208 to ascertain the amplitude of line input signal 122. Condenser fan drive circuit 504 selects 704 a frequency, corresponding to the amplitude, at which to operate condenser fan motor 110. For example, DSP 208 may use rules such as a lookup table or software algorithms, for example, a polynomial determined by regression analysis, to select a frequency at which to operate condenser fan motor 110. Condenser fan drive circuit 504 supplies 706 the stator windings of condenser fan motor 110 with a condenser fan current signal 126 having the selected frequency. For example, DSP 208 generates and transmits control signal 214 to inverter 204 to control inverter 204 to supply stator windings of condenser fan motor 110 with a condenser fan current signal 126 having the selected frequency. Method 700 may be used in operating evaporator fan drive circuit 506 of FIG. 5 as well as condenser fan drive circuit 504.

Figure 8:
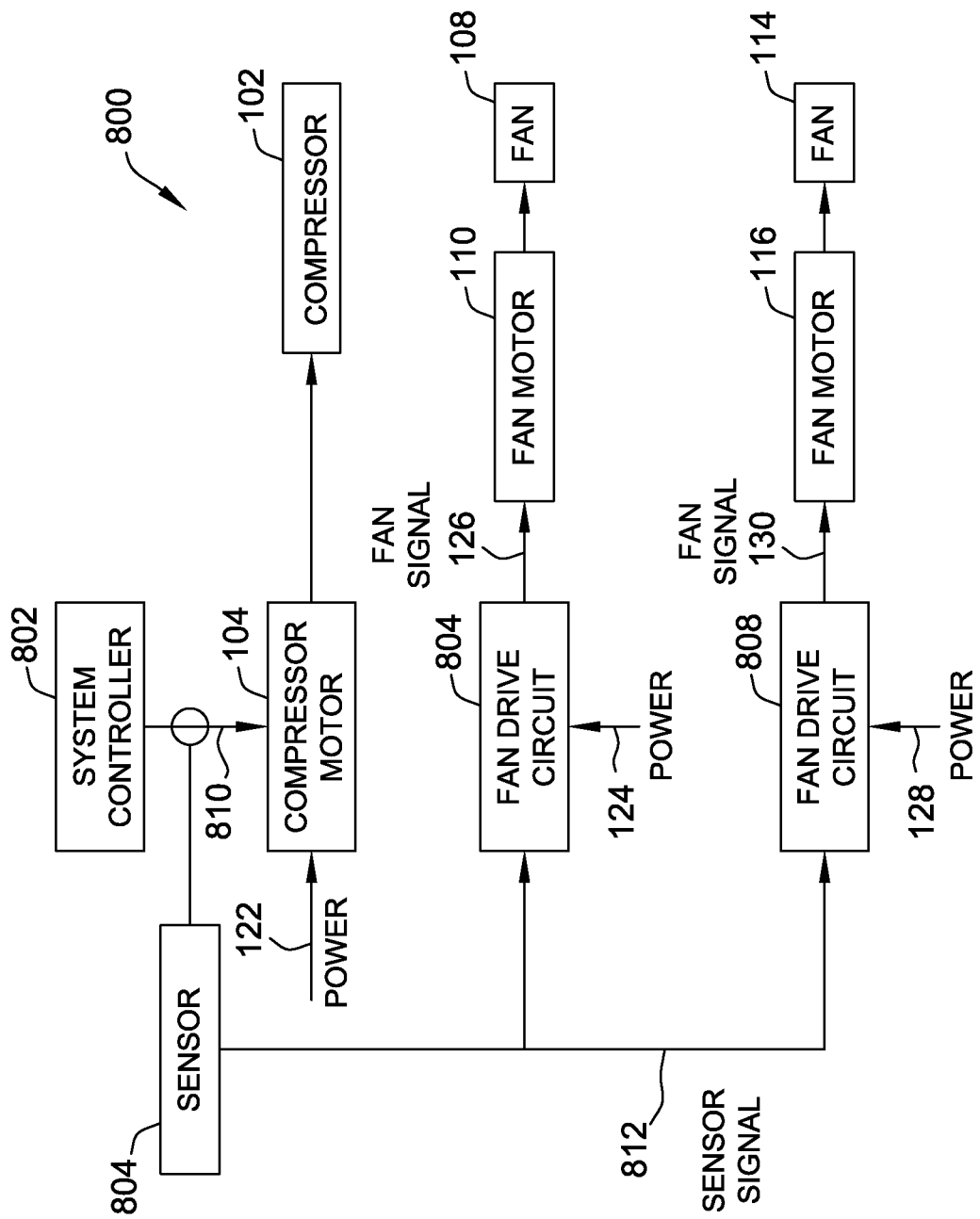
FIG. 8 is a block diagram of another exemplary cooling system.

FIG. 8 is a block diagram of an exemplary cooling system 800. Cooling system 800 includes compressor 102, compressor motor 104, a condenser fan 108, a condenser fan motor 110, an evaporator fan 114, and an evaporator fan motor 116, which each generally function as described with respect to FIGS. 1 and 5. Cooling system 800 further includes a system controller 802, a sensor 804, a condenser fan drive circuit 806, and an evaporator fan drive circuit 808. In some embodiments, compressor motor 104 may be a single speed motor with multiple capacities operated through the energization of 24 volt AC relay coils.

System controller 802 is coupled in communication with compressor motor 104 and is configured to generate a control signal 810. In certain embodiments, system controller 802 is a thermostat or other device configured to control cooling system 800. Compressor motor 104 operates according to one or more modes based on control signal 810. Accordingly, system control 802 can control the mode of operation of compressor motor 104 and compressor 102. The modes of operation may correspond to, for example, different compressor speeds. Control signal 810 may be, for example, a digital logic signal or an analog signal, such as a 24 volt AC signal.

Sensor 804 is configured to detect a status of control signal 810 such as, for example, a present operating mode defined by control signal 810. Based on the detected control status, sensor 804 generates a sensor signal 812, which may be, for example, an analog or digital signal representing the detected operating mode. As describe in further detail below, utilizing sensor 804 enables condenser fan drive circuit 806 and evaporator fan drive circuit 808 to determine the operating mode of compressor 102 without the need to be directly coupled to system controller 802 or compressor motor 104, increasing the ease with which condenser fan drive circuit 806 can be installed within an existing system.

Condenser fan drive circuit 806 and evaporator fan drive circuit 808 generally function as described with respect to condenser fan drive circuit 504 and evaporator fan drive circuit 506, respectively. Condenser fan drive circuit 806 and evaporator fan drive circuit 808 are coupled in communication with sensor 804, and are configured to control respective speeds of condenser fan motor 110 and evaporator fan motor 116 based on sensor signal 812. Thus, the speed of condenser fan 108 and evaporator fan 114 can be adjusted to coordinate with the loading of compressor 102, and accordingly, more optimally match the demand of cooling system 800 at a given moment in time, enabling cooling system 800 to operate with greater energy efficiency.

Figure 9:
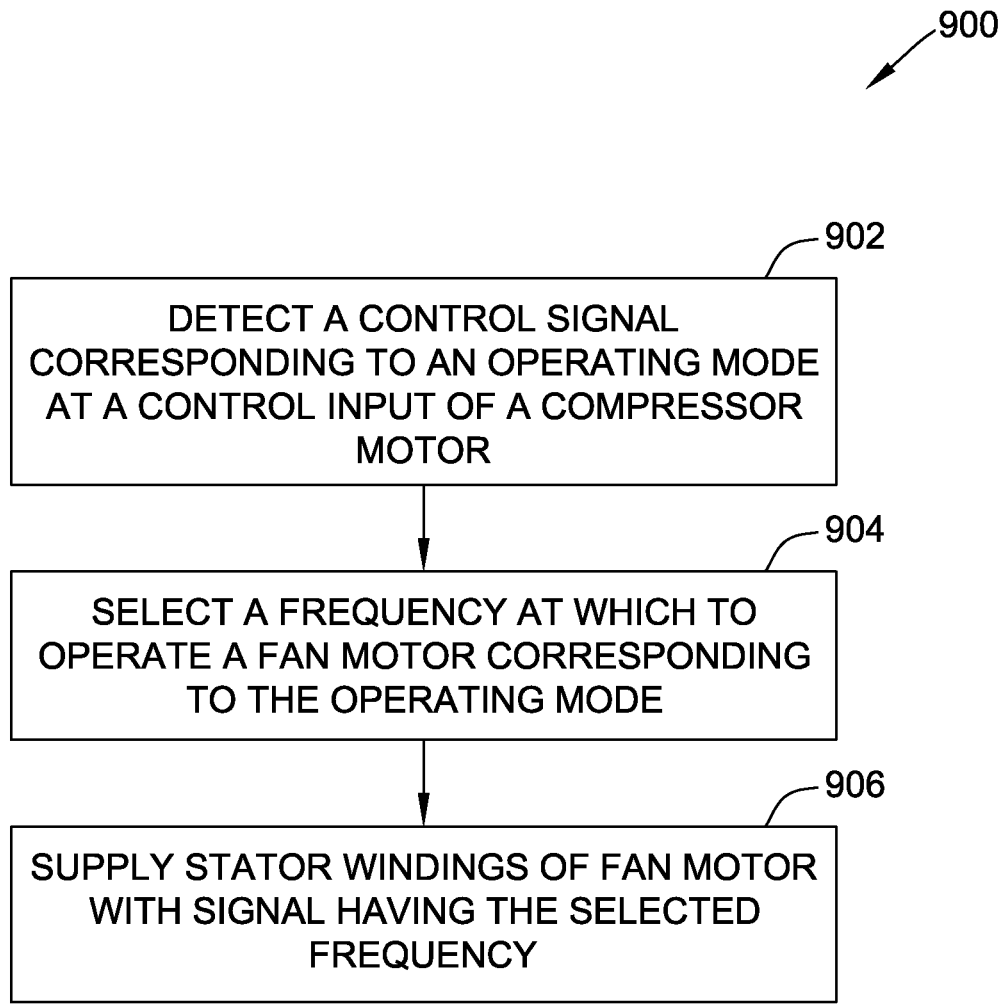
FIG. 9 is a flow chart of another exemplary method of operating a variable speed fan motor.

FIG. 9 is a flow chart of an exemplary method 900 of operating a variable speed fan motor such as condenser fan motor 110 shown in FIG. 8. Condenser fan drive circuit 806 detects 902 a control signal 810 corresponding to an operating mode at a control input of compressor motor 104. For example, sensor 804 of FIG. 8 may detect control signal 810, enabling DSP 208 to ascertain the present operating mode of compressor motor 104. Condenser fan drive circuit 806 selects 904 a frequency, corresponding to the operating mode, at which to operate condenser fan motor 110. For example, DSP 208 may use rules such as a lookup table to select a frequency at which to operate condenser fan motor 110. Condenser fan drive circuit 806 supplies 906 the stator windings of condenser fan motor 110 with a condenser fan current signal 126 having the selected frequency. For example, DSP 208 generates and transmits control signal 214 to inverter 204 to control inverter 204 to supply stator windings of condenser fan motor 110 with a condenser fan current signal 126 having the selected frequency. Method 900 may be used in operating evaporator fan drive circuit 808 of FIG. 8 as well as condenser fan drive circuit 806.

Technical effects of the system and method described herein include at least one of (a) operating a condenser fan for a cooling system at a variable speed; (b) operating an evaporator fan for a cooling system at a variable speed; (c) coordinating condenser fan speed, evaporator fan speed, or both speeds with the compressor speed or loading; (d) improving performance of cooling systems by coordination of fan speeds with the speed or loading of the compressor to more optimally meet the cooling demands of the system; and (e) improving energy efficiency of by coordination of fan speeds with the speed or loading of the compressor to more optimally meet the cooling demands of the system.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware"

are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan drive circuit for a variable speed fan motor in a cooling system, said fan drive circuit comprising:
   a fan inverter configured to supply a current signal to stator windings of the variable speed fan motor;
   a sensor coupled to a power input stage of a compressor motor and configured to generate a sensor signal, wherein the sensor signal represents an amplitude of one of a current or a power at the power input stage; and
   a digital signal processor (DSP) coupled to said fan inverter and said sensor, said DSP configured to:
      receive the sensor signal corresponding to the amplitude from said sensor;
      select a frequency corresponding to the amplitude at which to operate the variable speed fan motor; and
      transmit control signals to said fan inverter to supply current to the stator windings at the selected frequency.

2. The fan drive circuit of claim 1, wherein the compressor motor is configured to rotate a compressor of the cooling system.

3. The fan drive circuit of claim 1, wherein said sensor comprises a current transformer.

4. The fan drive circuit of claim 1, wherein said DSP is further configured to detect changes in the sensor signal over time to determine the amplitude.

5. The fan drive circuit of claim 1, wherein said DSP is further configured to select the frequency corresponding to the amplitude using a lookup table.

6. The fan drive circuit of claim 1, wherein said DSP is further configured to select the frequency corresponding to the amplitude by applying a polynomial function determined by regression analysis.

7. A method of operating a variable speed fan motor, said method comprising:
   detecting, by a variable speed fan drive circuit, an amplitude of one of a current or a power of a line input signal at a power input stage of an compressor motor;
   selecting, by the variable speed fan drive circuit, a frequency corresponding to the amplitude, at which to operate the variable speed fan motor; and
   supplying, by the variable speed fan drive circuit, a fan current signal to stator windings of the variable speed fan motor, the fan current signal having the selected frequency.

8. The method of claim 7, wherein the fan current signal is a square wave signal.

9. The method of claim 7, wherein the method further comprises generating, by a sensor, a sensor signal that corresponds to the amplitude of the line input signal.

10. The method of claim 9, wherein the method further comprises detecting, by the variable speed fan drive circuit, changes in the sensor signal over time to determine the amplitude.

11. The method of claim 7, wherein the method further comprises selecting, by the variable speed fan drive circuit, the frequency corresponding to the amplitude using a lookup table.

12. The method of claim 7, wherein the method further includes selecting, by the variable speed fan drive circuit, the frequency corresponding to the amplitude by applying a polynomial function determined by regression analysis.

13. A cooling system comprising:
    a compressor motor;
    a variable speed fan motor including fan stator windings; and
    a variable speed fan drive circuit coupled to said variable speed fan motor, said variable speed fan drive circuit comprising:
       a fan inverter configured to supply a current signal to said fan stator windings;
       a sensor coupled to a power input stage of said compressor motor and configured to detect an amplitude of one of a current or a power at the power input stage;
       a digital signal processor (DSP) coupled to said fan inverter and said sensor, the DSP configured to:
          receive a sensor signal corresponding to the amplitude from said sensor;
          select a frequency corresponding to the amplitude or at which to operate said variable speed fan motor; and
          transmit control signals to said fan inverter to control said fan inverter to supply current to said fan stator windings at the selected frequency.

14. The cooling system of claim 13, wherein said cooling system further comprises a condenser fan, said variable speed fan motor is coupled to said condenser fan.

15. The cooling system of claim 13, wherein said cooling system further comprises an evaporator fan, said variable speed fan motor is coupled to said evaporator fan.

16. The cooling system of claim 13, wherein said variable speed fan motor is an electronically commutated motor.

17. The cooling system of claim 13, wherein said sensor comprises a current transformer.

18. The cooling system of claim 13, wherein said sensor comprises an analog to digital converter.

19. The cooling system of claim 13, wherein said DSP is further configured to detect a control status of said compressor motor.

20. The cooling system of claim 19, wherein said DSP is configured to select the frequency further based on the control status.

\* \* \* \* \*